Figure 1:
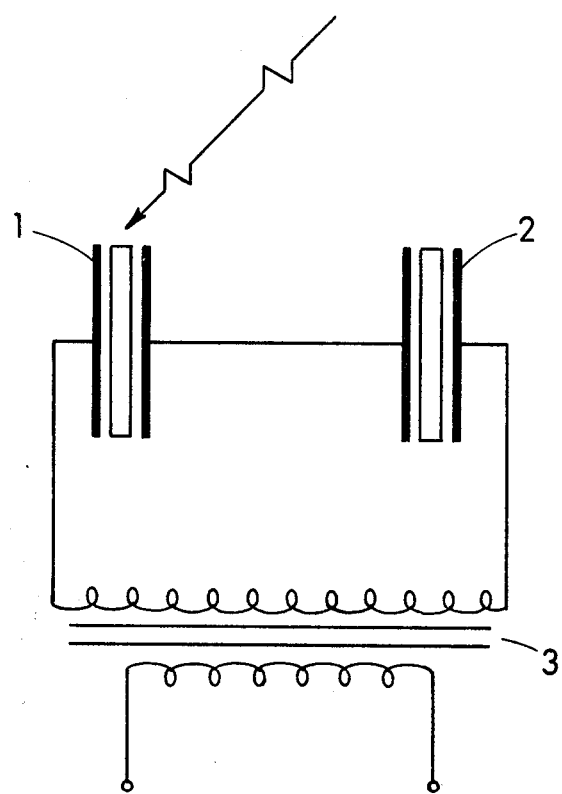

United States Patent [19]

O'Hare

[11] 4,074,129

[45] Feb. 14, 1978

[54] ELECTRIC GENERATION BY LIGHT-VARIABLE CAPACITANCE

[76] Inventor: Louis R. O'Hare, 1041 Ponderosa Apt. 2, Fort Collins, Colo. 80521

[21] Appl. No.: 669,384

[22] Filed: Mar. 22, 1976

[51] Int. Cl.² ............................................. H01J 39/12
[52] U.S. Cl. .................................... 250/212; 250/336; 310/308
[58] Field of Search ................... 250/211 R, 215, 336, 250/212; 310/5, 10

[56] References Cited

U.S. PATENT DOCUMENTS 3,971,938  7/1976  O'Hare ............................ 250/211 R Primary Examiner—David C. Nelms

[57] ABSTRACT

An improvement in a method of generating electric power by high voltage light or radiation variable electric capacitors is disclosed in which two distinct generating units are maintained in electrically separated circuits, neither unit interacting with the other electrically, thereby providing for a simple means of overcoming waste of collected and concentrated radiant energy in that a simple shutter alternates the beam of light or radiation back and forth between two or more radiation variable capacitors to prevent waste by preventing the concentrated energy from ever falling upon an unreactive surface and further to prevent waste by preventing momentary counter e.m.f. inherent in some prior art.

4 Claims, 3 Drawing Figures

ELECTRIC GENERATION BY LIGHT-VARIABLE CAPACITANCE

This invention relates to the unusual class of electric generators which produce useful electric power by the use of electric fields rather than by magnetic fields. It also relates to energy conversion techniques which convert radiant energy into electric energy with few moving parts. This invention therefore relates to a combination of the art of electric power development by changing electric capacitance and the art of converting radiation into a capacitance change in the light sensitive dielectric of a variable capacitor in a variable capacitance generator. In prior patent applications, Ser. No. 338,088, now U.S. Pat. No. 3,971,938, and an application called, "Improvement in Solar-Electric Generation", Ser. No. 663,927 circuitry and materials have been described for a workable light-variable capacitance generator. In the most recent improvement in this art a circuit is described which precludes energy loses to any great extent due to relatively inefficient shuttering of radiant energy in the initial generators. Accordingly, in the prior art shuttering was disclosed which directed a beam of light alternately to various light sensitive capacitors and in so doing the beam was never absent from one or other of the energy capacitors. Push pull type circuitry was developed to integrate with the shutter system designed to prevent wasted energy. Active element placement units have also been described in the prior art wherein parts of the same beam are never interacting to oppose the action of other parts of that beam.

Now, however, in my present invention an inherent and efficiency-limiting effect of the prior art is discovered and corrected in the electric circuitry as it relates to the peculiar dynamics of the light sensitive elements being oppositely shuttered to produce the necessary constantly changing capacitance. Specifically, this improvement relates to effects in the push pull circuitry of the second application referred to above and called, "Improved Solar-Electric Generation." In this application for patent two instead of one light-variable capacitors shared an electric charge in an essentially isolated electric circuit, which contained a transformer in series with these condensers. There the light alternating repeatedly from one to another condenser caused the charge shared by the two to be distributed unevenly, the newly illuminated of the two always receiving more of the charge as the light beam alternates beam alternates between the two. The transformer is continually acting to induce useful current flow into the secondary from the part of the condensers' charge which is cycling back and forth through the primary. This circuit is effective in that light in the way described is always reacting upon some reactive condenser and never wasted by merely being shuttered aside. However, the circuit does contain an inherent inefficiency in that the condenser which is darkening or darkened during particular time periods is subject to electroluminescence caused by the voltage increase on that capacitor. This consumes energy from the circuit. Fluorescent materials suited to produce dielectric constant change as a light variable dielectric also produce electroluminescence when in a dark state and when a changing voltage field is produced across them. Therefore the improvement in this art provided by this present invention comprises maintaining the alternate light sensitive dielectrics before a beam which alternates between them, but it also consists in rejecting the use of light sensitive in a push pull configuration in which the condenser being illuminated can contribute (by virtue of its lowering voltage) to a changing field across the darkened condenser. In this improvement then the original fixed condensed of the first application is always employed in each generating unit but now in this present invention the units are always grouped in multiples before the shutter and the units are electrically isolated one from the other and to the extent of preventing dynamic action of one from causing wasteful electroluminescence in the other. In short in this invention concentrated and collected radiant energy moves back and forth between two virtually seperate generators.

In other words the utilization of multiple and electrically separated generating circuits has the uniquely advantageous effect of assuring that within each generating circuit no dynamic source of field voltage change external to a darkened condenser will be consuming light energy to produce electroluminescence instead of simply producing electricity. In the former art during a light variable condenser's dark period, part of its voltage increase is due to the dynamic enlargement of capacitance and decline of voltage of the opposite or illuminated condenser caused by the increase of its dielectric constant under illumination. The illuminated condenser is absorbing radiant energy, having its dielectric constant increased and thereby assisting in a current flow which is producing useful work as well as wasteful electroluminescence. This adverse condition of dark period electroluminescence is greatly diminished or removed in the case in which two light-active condensers do not operate in a push pull configuration as in this present improvement where not one but two uniquely separated units receive shuttered light.

A second distinctive characteristic of this present invention derives from the fact that in it no collected radiant energy simultaneously directed against two light-variable condensers at the same time because of imperfect shuttering will ever produce opposing simultaneous counteracting currents. This undesireable situation is possible in the prior art in the case in which two light-variable capacitors are receiving portions of the same beam for a short period as a rotating beam of some width is leaving one light-variable and moving on to the opposite one in the same circuit. During that brief period both dielectrics are simultaneously partially excited thereby briefly counteracting to impede current flow.

But in this present invention no generating element is effected by any simultaneity of brief double illuminations. The generating units are independent electrically. It does not matter to each single unit where else the light is reacting while it is reacting on it or moving off of it. None of the light-variable capacitors "sees" nor is effected by what is happening in the other as each is electrically isolated from interacting with the other. These advantages and their applications in specific electric circuitry are illucidated in the following drawings.

FIG. 1 of the drawings is a schematic diagram of a push pull light-variable capacity generator.

Figure 2:
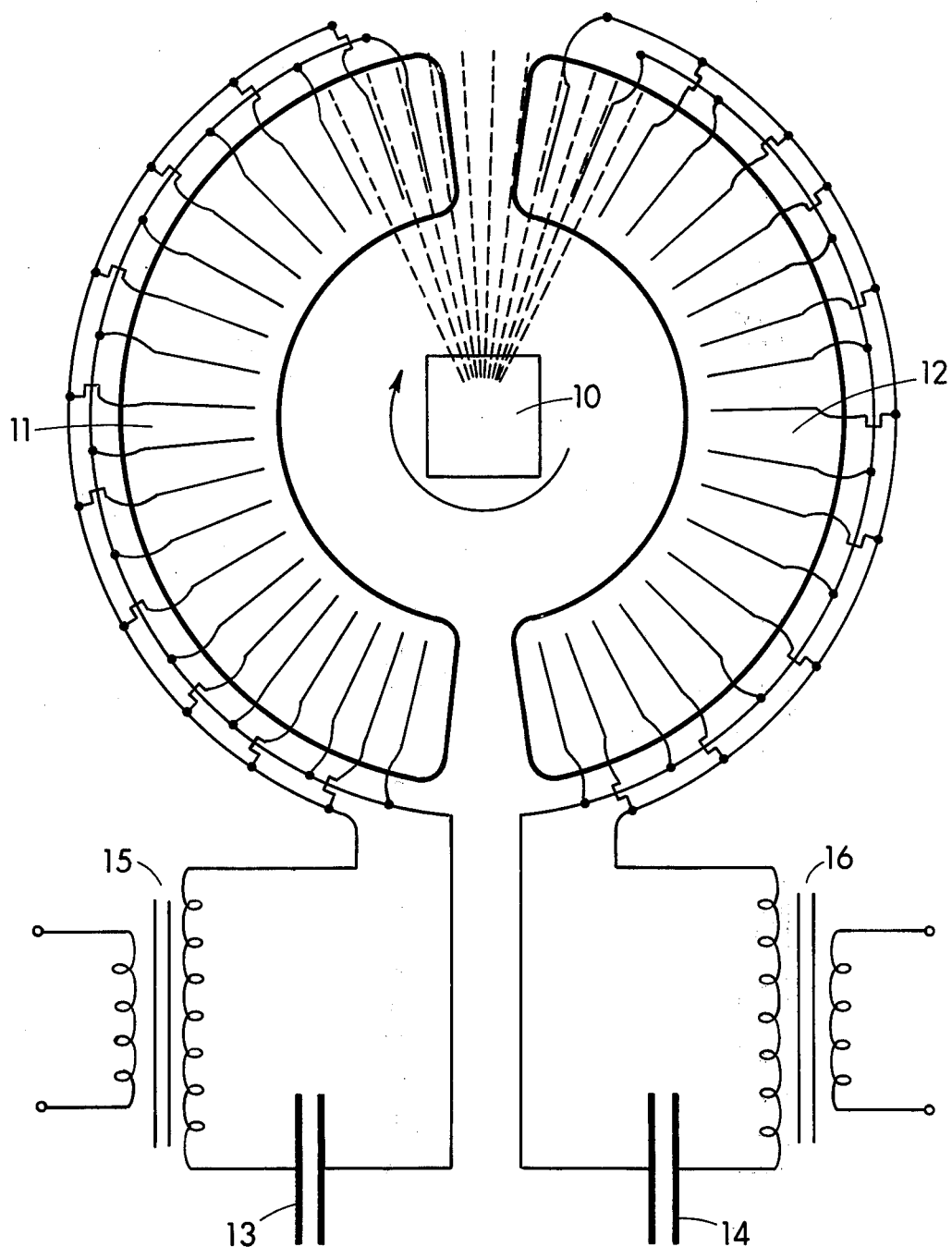

FIG. 2 of the drawings shows a diagramatic form a light-variable capacitance generator comprised of two separate light-variable generators alternately excited by the same beam of focusing light by means of the same shutter.

Figure 3:
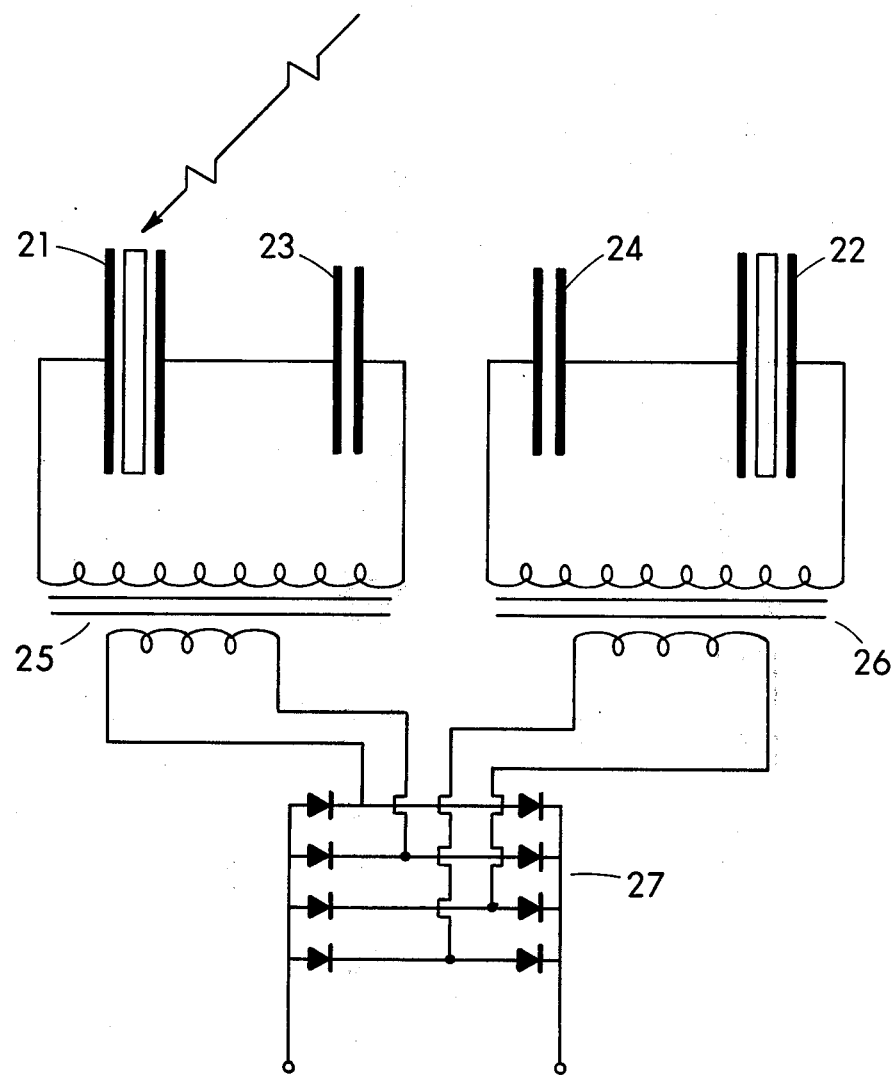

FIG. 3 of the drawings is a schematic diagram showing the combining of outputs of multiple light-variable capacitor units in such a manner as to prevent interactions in the light-reactive dielectrics.

Referring then to FIG. 1 of the drawings, when light-variable capacitors 1 and 2 share an electric charge and light falling upon the dielectric of 1 causes its capacitance to increase then the capacitor 2 having its voltage increase and its capacitance decrease has an increasing field potential across its plates produce electroluminescence in the light sensitive material. Some of the voltage increase in 2 is caused by the action of 1 wherein light is increasing the capacitance of 1 lowering the capacitance of 1 relative to 2, capacitor 1 thereby assisting in increasing the field voltage and electroluminescence in 2 producing wasted energy there. Similarly, when 2 is illumed and 1 is darkened the voltage elevation in 1 is partially caused by 2 and 2 utilizes light energy to produce electroluminescence and waste in 1.

Referring then to FIG. 2, the mirror 10 mounted in a transparent vacuum chamber receives concentrated and focused light from reflectors below (not shown) and as 10 rotates it directs the beam first onto light-variable capacitor 11 and then to 12. The condenser 11 shares a charge with condenser 13. Independently of 11 and 13 the light-variable capacitor 12 shares a charge with condenser 14. Portions of the charge shared between 11 and 13 cycle through transformer 15 as light and dark periods alternate upon 11. Portions of the charge of 12 and 14 cycle through transformer 16 as light and dark periods alternate upon light variable condenser 12. This arrangement comprises two separate generator units utilizing the collected light energy reflected by rotating mirror 10. No energy is wasted by the shutter 10 in that 10 does not at any time reflect light away from all reactive capacitors. The electrodynamic activity in 11 has no direct electrical effect upon what is happening in 12 and vise versa. There can be no opposing current flow and waste produced by the relationship between the two since 11 and 12 do not interact electrically.

Referring then to FIG. 3 which shows in a more schematic fashion the circuitry of FIG. 2 and shows as well how the essentially isolated generating units of FIG. 2 may be combined to a common d.c. output without destroying the essential isolation. The light that interacts with 21 increases its capacitance to receive a larger portion of a charge shared with 23. When 21 is illumened 22 is darkened and at that time the charge it shares with 24 has a larger portion residing in 24 due to the elevated voltage in 22 at that time. Transformers 25 and 26 separately transform the moving charge energy into useful electric power. Rectifier bank 27 rectifies the a.c. currents from the secondaries and sums them up.

I claim:

1. An improvement in the method of generating electricity from radiant energy by the use light variable capacitors in a variable capacitance electric generator comprising:
   concentrating light energy by reflecting surfaces focusing on a rotable mirror in a vacuum chamber,
   rotating the mirror to rotate the beam of light only upon successive separate light-variable capacitors of separate light-variable capacitance generators, thereby preventing electric interactions between light-variable capacitors,
   realizing and utilizing separate electric power outputs, one output from each of the separate generators.

2. An improvement as in claim 1 in which the separate outputs are subsequently combined by a stack of full-wave rectifiers, thereby preventing substantial interaction between the light reactive elements of the various generators.

3. A method to shutter electromagnetic radiation on multiple light variable capacitors in which concentrated light energy is always upon light-converting material without causing wasteful electric counter currents when beam width simultaneously irradiates two light variable dielectrics in sweeping from one to another by:
   causing each light-variable capacitor to function seperately in a seperate generator,
   placing the active element of each generator consecutively before a rotating beam of radiant energy so that whenever the beam is off f one it is on the other, but irrespectively of whether the beam irradiates subsequent generators simultaneously as the beam makes the transition from one generator to the other.

4. An improvement in the method of generating electricity from radiant energy by the use of variable capacitance electric generator in which a charge shared by two condensers, one a light-variable and the other a fixed, is made to circulate between the two condensers and a transformer in series with them comprising:
   placing separate generators' light variable capacitors in the path of a beam of light,
   so moving the beam of light or other radiant energy from one to the other within just the narrow limits that when it is irradiating one condenser it is not on another nor is it any where else except that in transitioning from one condenser to another briefly two may be illuminated.

* * * * *